US006222846B1

(12) United States Patent
Bonola et al.

(10) Patent No.: US 6,222,846 B1
(45) Date of Patent: Apr. 24, 2001

(54) METHOD AND SYSTEM FOR EMPLOYING A NON-MASKING INTERRUPT AS AN INPUT-OUTPUT PROCESSOR INTERRUPT

(75) Inventors: Thomas J. Bonola; Brian T. Purcell, both of Tomball; Mark L. Hammons, Magnolia, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/064,409

(22) Filed: Apr. 22, 1998

(51) Int. Cl.[7] ................................................. G06F 3/00
(52) U.S. Cl. ................................. 370/402; 710/49
(58) Field of Search ..................... 710/29, 32, 36, 710/48, 49, 50; 370/400, 401, 402–419

(56) References Cited

U.S. PATENT DOCUMENTS

| 5,530,597 | * | 6/1996 | Bowles et al. | 710/49 |
| 5,604,913 | * | 2/1997 | Koyanagi | 710/49 |
| 5,850,556 | * | 12/1998 | Grivna | 710/49 |
| 5,875,342 | * | 2/1999 | Temple | 710/49 |
| 6,003,109 | * | 12/1999 | Caldwell et al. | 710/49 |
| 6,115,779 | * | 9/2000 | Haubursin et al. | 710/49 |

\* cited by examiner

*Primary Examiner*—Ricky Ngo
(74) *Attorney, Agent, or Firm*—Williams, Morgan & Amerson, P.C.

(57) ABSTRACT

A computer system is provided that has an input-output processor having a non-masking interrupt. In addition to the central processing unit, the computer system has a host bus, a host operating system, at least one input-output bus connected to the host bus. At least one input-output device is connected to the input-output bus with facilities for connecting many more. In addition to the above-mentioned components, the computer system also includes a mask register. The mask register is capable of receiving input-output related messages from the host or from a local input-output device. The mask register is able to write a MASK signal based upon the received signals. Along with the mask register, the computer system is provided with a status register. The status register is capable of receiving input-output write messages from the host or from a local input-output device. The status register is used to write an INT signal based upon the message it receives. Additional circuitry is provided for processing the MASK signal from the mask register and the INT signal from the status register. This circuitry, depending upon the signals it receives from the mask register and the status register, triggers the non-masking interrupt of the input-output central processing unit which vectors to a trap routine that reroutes to the appropriate interrupt service routine based upon the settings in the status register.

20 Claims, 4 Drawing Sheets

METHOD AND SYSTEM FOR EMPLOYING A NON-MASKING INTERRUPT AS AN INPUT-OUTPUT PROCESSOR INTERRUPT

BACKGROUND OF THE INVENTION

1. Field of the Invention

The present invention relates to a computer system using input-output devices, and more particularly, to a computer system using an alternative prioritized interrupt dispatch procedure.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("E-mail"), document databases, video teleconferencing, whiteboarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has, been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure," dated May 20, 1996, the disclosures of which are hereby incorporated by reference. These PCI specifications and ECN are available from the PCI Special Interest Group, P.O. Box 14070, Portland, Oreg. 97214.

Computer system peripheral hardware devices, i.e., hard disks, CD-ROM readers, network interface cards, video graphics controllers, modems and the like, may be supplied by various hardware vendors. These hardware vendors must supply software drivers for their respective peripheral devices used in each computer system even though the peripheral device may plug into a standard PCI bus connector. The number of software drivers required for a peripheral device multiplies for each different computer and operating system. In addition, both the computer vendor, operating system vendor and software driver vendor must test and certify the many different combinations of peripheral devices and the respective software drivers used with the various computer and operating systems. Whenever a peripheral device or driver is changed or an operating system upgrade is made, re-testing and re-certification may be necessary.

The demand for peripheral device driver portability between operating systems and host computer systems, combined with increasing requirements for intelligent, distributed input-output ("I/O") processing has led to the development of an "Intelligent I/O" ("$I_2O$") specification. The intelligent I/O architecture defines an environment for creating device drivers that are functionally divided between the host operating system and an intelligent I/O subsystem. The basic objective of the $I_2O$ specification is to provide an I/O device driver architecture that is independent of both the specific peripheral device being controlled and the host operating system. This is achieved by logically separating the portion of the driver that is responsible for managing the peripheral device from the specific implementation details for the operating system that it serves. By doing so, the part of the driver that manages the peripheral device becomes portable across different computer and operating systems. The $I_2O$ specification also generalizes the nature of communication between the host computer system and peripheral hardware, thus providing processor and bus technology independence. The $I_2O$ specification, entitled "Intelligent I/O ($I_2O$) Architecture Specification," Draft Revision 1.5, dated March 1997, is available from the $I_2O$ Special Interest Group, 404 Balboa Street, San Francisco, Cali. 94118; the disclosure of this $I_2O$ specification is hereby incorporated by reference.

The $I_2O$ operation is optimized for a single host node and a number of intelligent I/O subsystems. A host node is one or more application processors (typically, CPUs) and their resources executing a single homogeneous operating system. A typical host node utilizes a PENTIUM PRO multiprocessor manufactured by Intel Corp. running WINOWS NT, manufactured by Microsoft Corp. as the host operating system (OS).

FIG. 1 shows a typical hardware architecture for a computer system 100, with a host node 101 and multiple embedded I/O processor nodes 131 and 141. The host node 101 has one or more central processing units 102 (CPUs) operating on a local bus 108 that connects the CPUs 102 to the shared memory 104 and the system bridge 106. The system bridge 106 connects the host node 101 to the input-output bus I/O. The input-output bus 110 is used to channel read and write messages to various I/O devices 160, 162, 164 and to the I/O processor nodes 131 and 141. Pursuant to the $I_2O$ specification referenced above and incorporated by reference herein, a processor that is dedicated to I/O is called an embedded I/O processor node or an I/O platform (IOP). As shown in FIG. 1, a typical IOP 141 consists of a processor 142, memory 144, and I/O devices 150 and 152 all connected by a local I/O bus 148. A system bridge 146 connects the IOP 141 to the input-output bus 110. In operation, the IOP 141 handles I/O transactions between the host node 101 and the I/O devices 150 and 152. Because the I/O devices 150 and 152 are not directly accessible to the host node 101, these I/O devices are said to be hidden. Consequently, the drivers for these devices must execute on the IOP 141, specifically on the CPU 142. The IOP 141 and its private devices can be contained on typical add-in feature card, or the IOP 141 can have one or more expansion buses of its own.

IOPs need not have I/O devices attached within their own node. For example, IOP 131 has a CPU 132, a local memory 134 connected by a local I/O bus 138 with a system bridge 136 connecting the local I/O bus 138 to the input/output bus 110. In the latter instance, messages between the host node 101 and the I/O devices 160, 162 and 164 can be processed by the CPU 132 of IOP 131. Unlike the IOP 141, the I/O devices 160, 162 and 164 are not hidden from the host node 101. Consequently, drivers for these devices can be loaded onto the host node 101 or, more favorably, on the IOP 131. An IOP 131 can be contained on an add-in feature card, or can be placed directly onto the main motherboard.

Aside from the $I_2O$ specification, it is anticipated that new input-output schemes will be developed in the future. However, current computer systems are ill-equipped to accommodate new schemes without additional hardware and its attendant complexity. Furthermore, the prior art method of performing external interrupt prioritization was to implement two 8259 interrupt controllers in a master/slave configuration, or implement an advanced programmable interrupt controller (APIC) architecture. These interrupt controllers performed interrupt prioritization and multiplexed 16 or more external interrupt sources to a single interrupt line that interfaced to the processor's INTR input. This method required interrupt acknowledge cycles to occur between the CPU and the interrupt controller as well as an end-of-interrupt (EIO) to be issued by the CPU. One disadvantage of the prior are method is that the CPU has to read its interrupt vector information from the data bus (typically as an ISA or APIC bus cycle from the interrupt controller). A second disadvantage in the prior art is that software must generate at least one, and possibly two EOI sequences to the interrupt controllers to reset the pending interrupt at the controller. This requires the CPU to generate more ISA or APIC bus cycles in the context of the interrupt handler. A final disadvantage of the prior art method is that software must perform atomic read/modify/write sequences to modify the interrupt masks on the interrupt controllers. There is, therefore, a need in the art for a method and apparatus that can implement an alternative input-output interrupt procedure which may be reconfigured easily to accommodate changes in technology. The present invention overcomes the above-identified problems as well as other shortcomings and deficiencies of existing technologies

SUMMARY OF THE INVENTION

The present invention provides a computer system having one or more central processing units, and an input-output processor having a non-masking interrupt. In addition to the central processing units, the computer system of the present invention has a host bus, a host operating system, at least one input-output bus connected to the host bus. At least one input-output device is connected to the input-output bus with facilities for connecting many more.

In addition to the above-mentioned components, the present invention also includes a doorbell mask register (mask register). The mask register is capable of receiving I/O-related write messages from the host node as well as messages written by a local I/O device. The bits within the doorbell status register are set according to the specific interrupt message received from the host node or the I/O device.

Along with the mask register, the present invention also includes a doorbell status register (status register). Like the mask register, the status register is capable of receiving I/Orelated messages from the host node as well as messages written by local I/O devices. Like the mask register, the bits within the doorbell status register are set according to the specific interrupt message received form the host node or the I/O device.

Circuitry is provided within a control register unit that utilizes the mask register to filter out subsequent write messages that are merely copies of the message currently being handled or messages of lower priority. If the message must be handled, the control register unit issues a non-maskable interrupt to the CPU of the IOP. The present invention takes advantage of the fact that the NMI has a hard-coded vector to the interrupt dispatch table where the trap program of the present invention awaits. The trap program reads the doorbell status register and uses the bit-arrangement of the status register to vector to the appropriate interrupt service routine. The CPU of the IOP then clears the bits of the status register and the mask register for future operations.

By using the hard-coded NMI vector, the present invention does not have to perform external bus cycles to obtain the interrupt vector information. Thus, using the NMI, no software need perform EOls (unlike the prior art method). Furthermore, the software can mask and reset external interrupt sources without having to perform atomic read/modify/write sequences to external hardware (unlike the prior art method).

The components of the present invention allow for software emulated interrupts for future input-output devices having hardware interrupts that are not compatible with the existing input-output processor or IOP board. Drivers for the future input-output devices can be enabled to issue the software emulated interrupts. The present invention allows installation of these future devices onto legacy computer systems without expensive retrofitting of hardware components because the processor does not require interrupt controllers to perform external interrupt prioritization. Furthermore, software can determine the external interrupt prioritization without having to reprogram specialized hardware. Finally, the present invention supports up to 32 external local interrupt sources and is capable of supporting many more and does so with a very low interrupt dispatch latency.

Therefore, the present invention solves the technical problem of refitting legacy computer systems with future input-output hardware implementations without the need for extensive hardware modifications. Other and further features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 1:
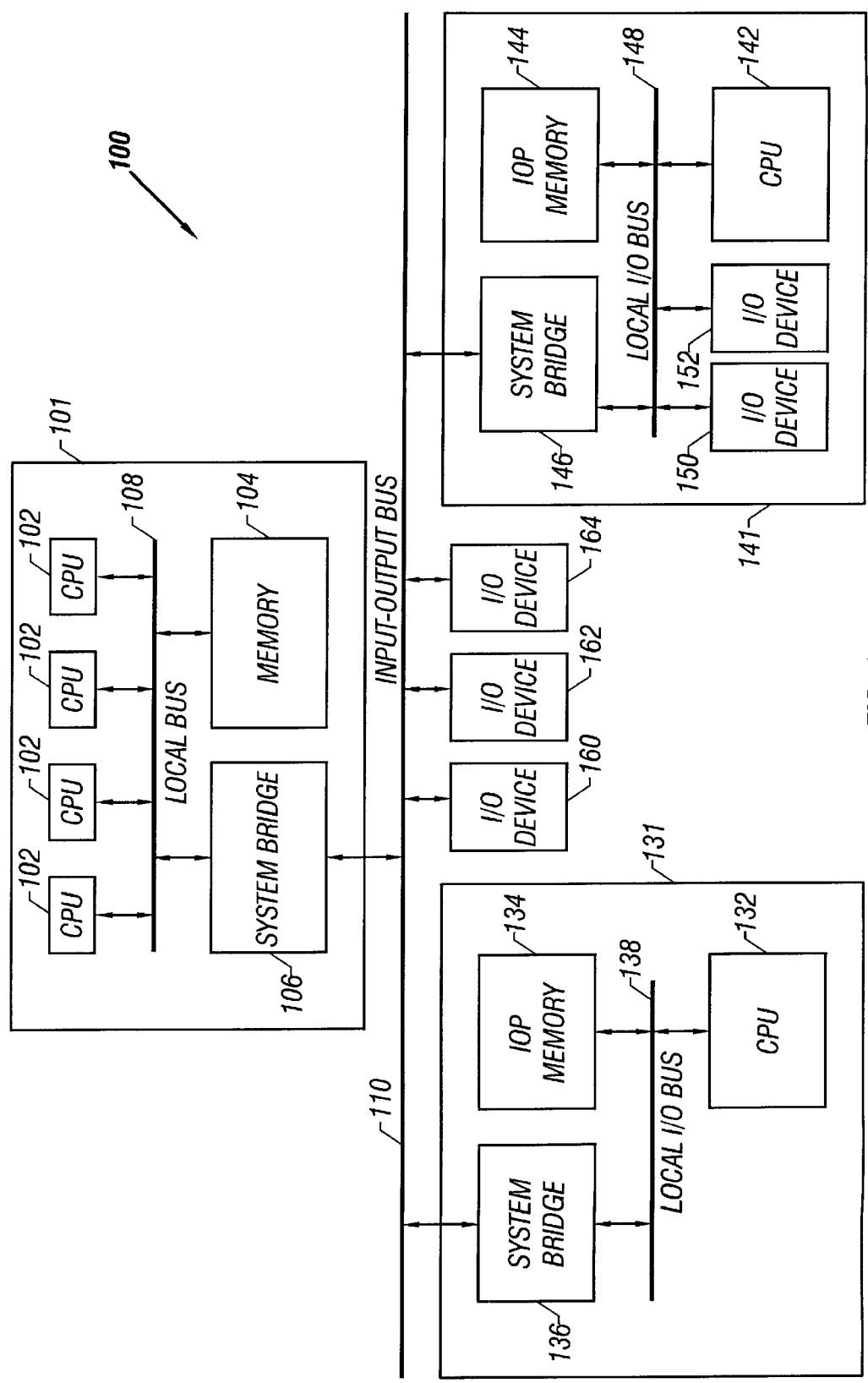
FIG. 1 is a schematic block diagram of a typical computer system utilizing the $I_2O$ architecture.
Figure 2:
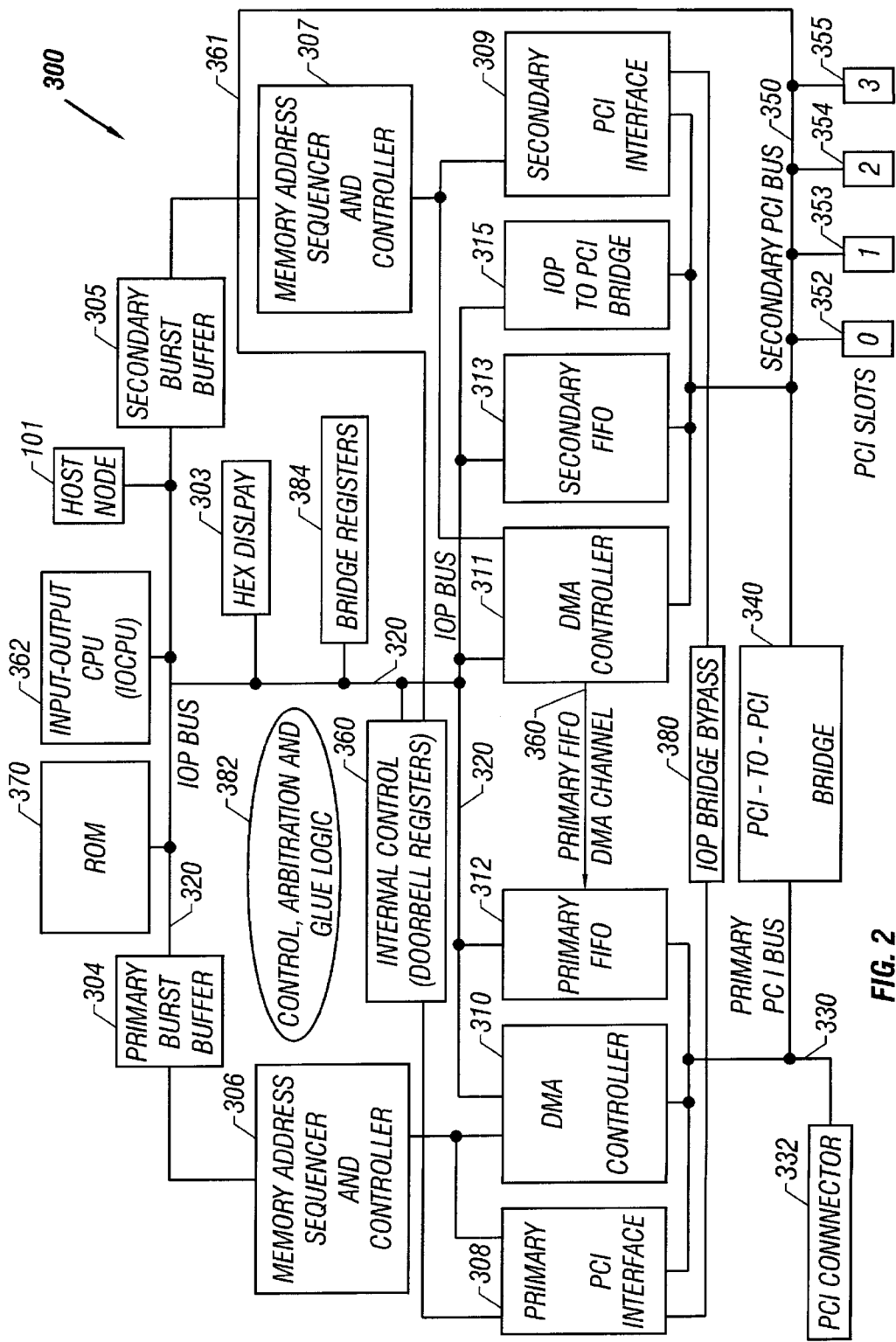
FIG. 2 is a schematic block diagram of an IOP of the present invention.

FIG. 2 shows the input-output device-related portion of a computer system of the present invention. The non-input-output portion of the computer system of the present invention can be of conventional design. As shown in FIG. 2, the input-output section of the present invention is structured differently than the prior art input-output platform 131 or 141 of FIG. 1. First, there is an internal control registers 360 linking the primary PCI interface 308 (of the primary PCI bus 330) to the input-output processor (IOCPU) 362. This linkage enables I/O related write messages from the host node 101 to be received by the control registers 360. The internal control registers 360 comprise the doorbell mask register and the doorbell status register and the associated circuitry that enables the present invention to determine the external interrupt prioritization without having to modify specialized hardware. The internal control registers 360 are explained more fully hereinbelow. The internal control register 360 also has inputs 361 from the secondary PCI bus 350 as shown in FIG. 2. These inputs 361 are for the PCI interrupt signals (INTx#) written from the devices installed in PCI slots 352, 353, 354, and 355 on the secondary PCI bus 350 and provide external (i.e., non-software generated) interrupt sources. The present invention utilizes the hard-coded vector associated with the NMI event of the IOCPU 362 and does not have to perform external bus cycles in order to obtain the interrupt vector information.

FIG. 2 illustrates an embodiment of the present invention. At the core of the input-output section 300 of the computer system is the IOCPU 362. The input-output section 300 is connected to the local host bus (not shown) of the computer system. The input-output processor bus (IOP bus) 320 connects the IOCPU 362 to various other components within the input-output section 300. For instance, the host bus connects the IOCPU 362 to the read only memory (ROM) 370 and the host node 101 that runs the host operating system. The IOCPU 362 stores its boot-up code and operating system within the ROM 370. Through the IOP bus 320, the IOCPU 362 is connected to the primary burst buffer 304, the secondary burst buffer 305, a hex display 303, and the bridge registers 384. In the preferred embodiment of the present invention, the primary burst buffer 304 and the secondary burst buffer 305 form the IOCPU's 362 local shared memory that is, for example, dynamic random access memory (DRAM). Connections between the IOCPU 362 and peripheral devices are accomplished through an input-output scheme comprising, among other things, a primary PCI bus 330 and secondary PCI bus 350. The secondary PCI bus 350 has PCI slots 352, 353, 354, and 355 and/or a PCI connector 332 that enable the peripheral devices (not shown) to be connected to the input-output section 300. The IOCPU 362 handles routine input-output messaging in order to relieve the central processor unit(s) on the host node 101 from these tasks, thereby increasing overall performance of the computer system.

As shown in FIG. 2, both PCI buses 330 and 350 are separated from the IOP 320 by various components. Referring to the left-hand portion of FIG. 2, the primary burst buffer 304 is connected to a memory address sequencer and controller (MASAC) 306. MASAC 306, in turn, is connected to a direct memory access (DMA) controller 310 and the primary PCI interface 308. The DMA controller 310 and the primary FIFO 312 are connected to the IOP bus 320 The primary PCI interface 308, the DMA controller 310 and the primary FIFO 312 are connected to the primary PCI bus 330. In the preferred embodiment of the present invention, the primary PCI bus 330 is connected to the IOCPU 362 via internal registers 360 that links the primary PCI interface 308 and the secondary PCI bus 350 to the IOP bus 320 (and hence the IOCPU 362). Direct communication between the IOCPU 362 and the primary PCI bus 330 involves doing first through the IOP-PCI bridge 315, then onto the secondary PCI bus 350, and finally through the PCI-to-PCI bridge 340 onto the primary PCI bus 330.

Referring now to the right-hand portion of FIG. 2, another (secondary) MASAC 307 is connected to the secondary burst buffer 305. As with the primary MASAC 306, the secondary MASAC 307 is connected to a second DMA controller 311 and the secondary PCI interface 309. Likewise, the second DMA controller 311 and the secondary FIFO 313 are connected to the IOP bus 320. Unlike the primary system, the secondary system has an IOP-to-PCI bridge 315 that is connected to the IOP bus 320. In an alternate embodiment of the present invention, a second IOP-to-PCI bridge, similar to the IOP to PCI bridge 315, could be inserted in between the IOP bus 320 and the primary PCI bus 330. Finally, the second DMA controller 311, the secondary FIFO 313, the secondary PCI interface 309, and the IOP-to-PCI bridge 315 are connected to the secondary PCI bus 350. The primary and secondary PCI buses can be connected via a PCI-to-PCI bridge 340 as illustrated in FIG. 2. The PCI-to-PCI bridge 340 provides the arbitration for devices connected to the secondary PCI bus 350. In the preferred embodiment of the present invention, an IOP bridge bypass 380 is located between secondary PCI interface 309 and the primary PCI interface 308.

In the present invention, four PCI slots (352, 353, 354, and 355) are provided to accommodate a wide variety and number of PCI devices, including network interface cards, and mass storage controllers. The present invention allows devices to be treated as inputoutput scheme-compliant on a slot-by-slot basis, enabling, for example, $I_2O$ and non-$I_2O$ devices to exist on the same PCI bus. Thus the present invention accommodates those computer systems that have only one PCI bus with a device that has better performance operating in a non-$I_2O$ mode, while other attached devices may have better performance operating in an $I_2O$ mode. The ability to mixing $I_2O$ and non-$I_2O$ devices provides the best performance and flexibility in a computer system having a limited number of slots. The present invention eliminates "wasted" slots where the computer system has only one or two $I_2O$ adapters and several non-$I_2O$ adapters.

Figure 3:
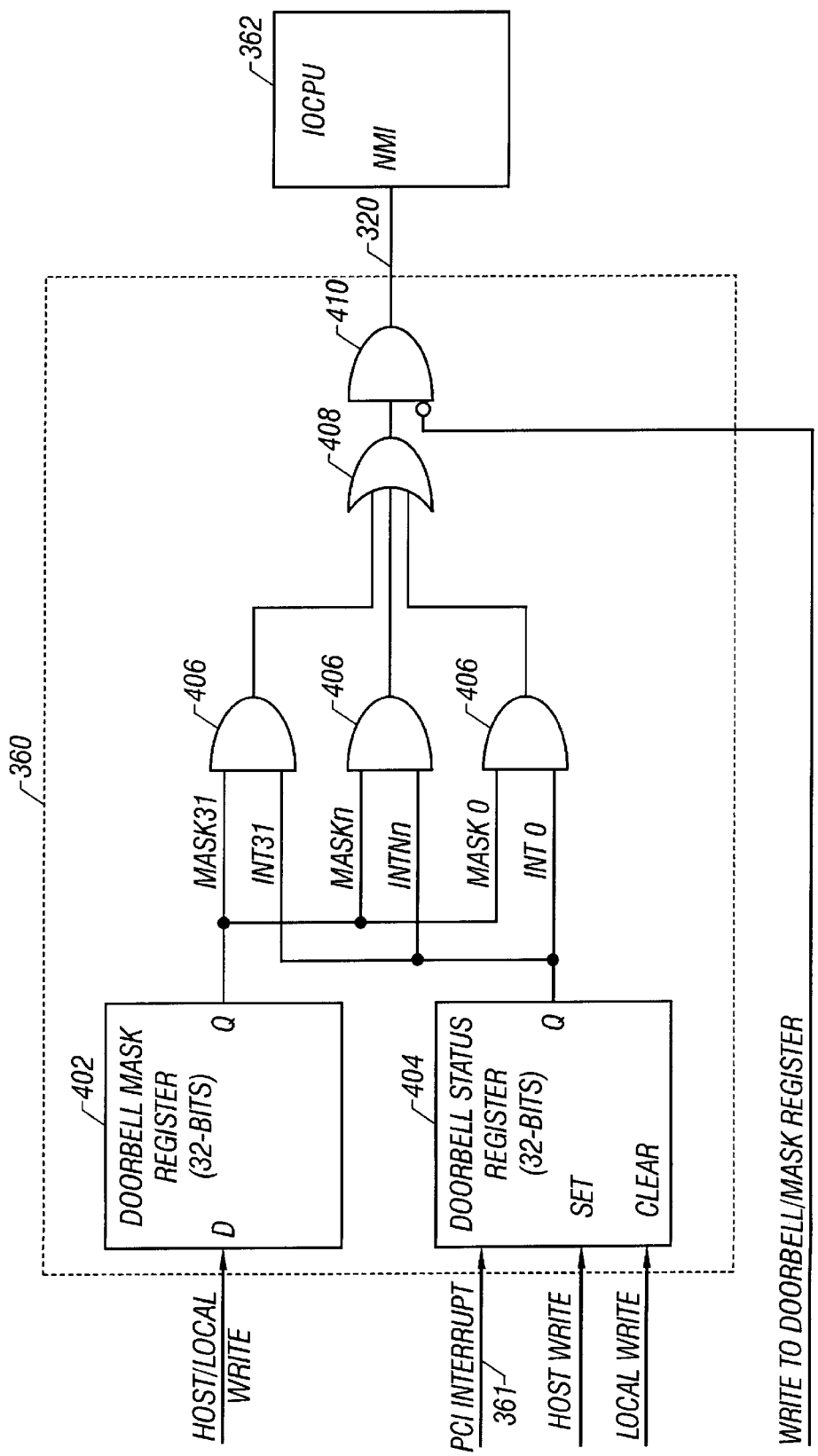
FIG. 3 is a schematic block diagram of the circuitry of the internal control registers according to the present invention.

The circuitry of the present invention is shown in FIG. 3. As shown in FIG. 3, the internal control registers 360 contains the doorbell mask register 402 and the doorbell status register 404. The doorbell mask register 402 has the capability to receive write messages from the host node 101 (see FIG. 2) or from other devices on the IOP 300 at the doorbell mask register 402 input D. The doorbell mask register 402 is further capable of writing out each bit within the register (designated as MASKx) to a series of AND gates 406 connected to output Q as shown in FIG. 3. In the preferred embodiment of the present invention, the doorbell mask register contains 32 bits.

The doorbell status register, like the doorbell mask register, contains 32 bits in the preferred embodiment of the present invention. In order for a proper bit-by-bit comparison to occur between the doorbell mask register and the doorbell status registers, it is important that the two registers contain an equal number of bits. Like the mask register 402, the status register 404 has the capability to receive messages written from the host node 101 (at SET) and from other devices in the IOP 300 via the PCI interrupt input 361. Unlike the mask register 402, the status register 404 has the capability to be cleared with a local message written at CLEAR. As with the mask register 402, the status register 404 is capable of writing out each bit within the register (designated INTX) to a series of AND gates 406 as shown in FIG. 3.

Each bit of the mask register 402 and the status register 404 is sent though a series of AND gates 406 in a bit-by-bit fashion as shown in FIG. 3. The result of each AND gate 406 forms a partial input to the OR gate 408 so that the OR gate 408 will be TRUE if any one bit setting within the status register 404 corresponds to any one bit setting within the mask register 402. In this way, the host node 101 (specifically, a host CPU 102) can interrupt the IOP 300 by setting any bit in the doorbell status register 404 whose corresponding bit in the mask register 402 is set to a logic '1'. This is called a rising edge condition.

The result of the OR gate 408 forms one of the inputs to a final AND gate 410. The other input to the final AND gate 410 is the negation of the same write message to the status register 404 and the mask register 402. This has the effect of canceling (ignoring) subsequent write messages containing the same interrupt message (that sets the same bit within the status register 404) or a message of lower priority. If the received message is of the same priority (but not the same message), or is of higher priority, then the result of the AND gate 410 is true and the NMI is issued to IOCPU 362.

In the preferred embodiment of the present invention, the NMI input line must be low for eight clock cycles (CLK2) and remain high for at least eight clock cycles (CLK2) in order to be recognized as a valid NMI by the IOCPU 362. Once the NMI interrupt service routine begins execution, no other NMIs are recognized until the IOCPU 362 performs the IRET instruction. One MNI interrupt can remain pending before the IRET instruction is executed.

In an alternate embodiment of the present invention, the doorbell registers (i.e., the status register and the mask registers) can be emulated by software on the host node 101. Specifically, the status register and the mask register could use the system memory 104 (see FIG. 1) and utilize one or more of the central processing units 102 on the host node 101 for input-output processing. The emulated doorbell status register and emulated doorbell mask register could reside in the system memory 104 or they could reside and be implemented in the hardware abstraction layer (HAL) (not shown) of the host operating system. The circuitry for invoking the NMI on the IOCPU 362 could still reside on the IOP 300 as described above, or the circuitry itself could be emulated in the form of a signal handler on the HAL processing the bits in the mask register (e.g. as a MASK signal) and the bits in the status register (e.g. as an INT signal) to trigger the non-maskable interrupt of the IOCPU 362. In yet another alternate embodiment, the doorbell registers (both status and mask) could be implemented in hardware on the IOP 300 and the circuitry for handling the mask and status register bits could be emulated in software on the host OS. The alternate embodiment has the advantage of not requiring one or more pieces of the specialized hardware of the doorbell registers (both status and mask) and its associated circuitry. Software residing in the HAL could also emulate the circuitry described above and in FIG. 3 to prioritize the subsequent interrupts as they are received. Thus the alternate embodiment is a candidate for legacy computer systems that cannot be retrofitted with the necessary hardware of the preferred embodiment yet still accommodate most input-output devices that must be compliant with diverse input-output schemes such as $I_2O$.

Figure 4:
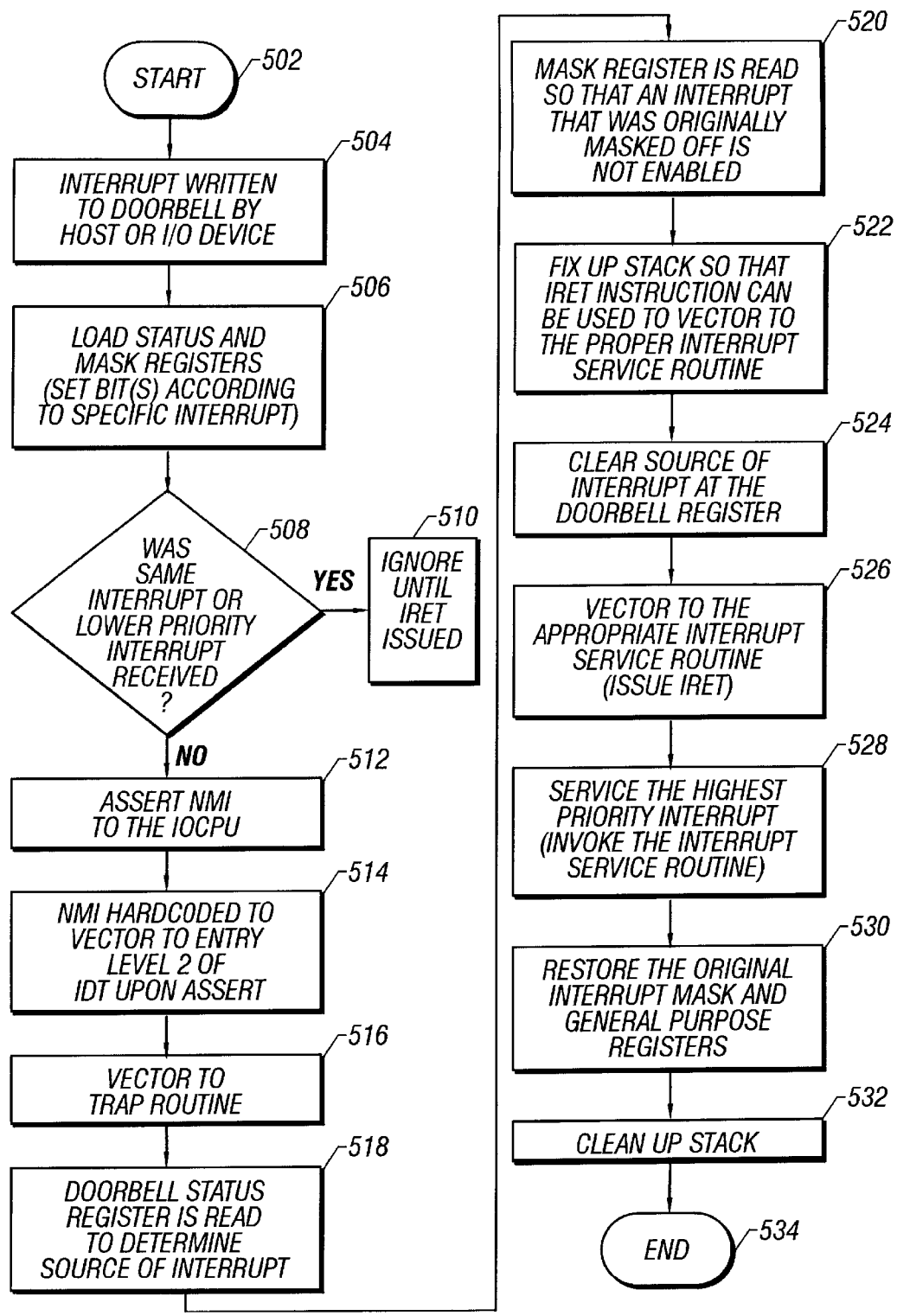
FIG. 4 is a flowchart of the operation of the present invention.

The method of operation of the present invention is illustrated in FIG. 4. The operation is started in step 502. First, in step 504, an interrupt is written to the doorbell register, either by the host OS or by an I/O device. Next, in step 506, the interrupt message is used to set the bits of the doorbell and mask register. This technique allows the doorbell register to be set automatically depending upon the type of interrupt encountered. The reason that the interrupt message is also written to the mask register is that, with a copy of the current interrupt message, the mask register may be compared to later-received interrupt messages in order to exclude copies of the currently-handled message or those of lower priority. Accordingly, in step 508, a check is made to determine if a later-received interrupt is the same interrupt message received before (and currently handled) or if the new interrupt message has a priority lower than the one currently being handled. If the result of step 508 is positive (i.e., the newly-received interrupt message is the same message or one of lower priority, the newly-received message is ignored until an IRET is issued. Conversely, if the newly-received interrupt message is new or is of higher priority, execution continues onto step 512. The method of the present invention provides a powerful capability to devise future interrupt priority schemes without modifying the hardware of present invention because future device drivers and operating systems can be modified easily to issue reconfigured interrupt messages.

Once the interrupt message has been accepted for processing, an NMI is asserted to the IOCPU in step 512. The IOCPU has a specific NMI vector that is hard-coded into the IOCPU (entry level 2 of the Interrupt Dispatch Table (IDT) in the case of the preferred embodiment of the present invention) as shown in step 514. A trap routine is stationed at entry level 2 of the IDT to which the NMI vectors to in step 516. The trap routine reads the doorbell status register to determine the source of the interrupt in step 518. The mask register is read in step 520 to ensure that the interrupt message that was originally masked off (to be handled) is not enabled.

The present invention can, at this point, fix up a local stack so that the IRET instruction itself can be used to vector to the proper interrupt service routine (ISR) in step 522. This is an efficient method of vectoring and is the preferred technique for the present invention. Next, in step 524, the source of the interrupt in the doorbell register is cleared. With the IRET instruction configured (per step 522), the IRET is issued so as to vector to the appropriate ISR in step 526. Once vectored, the highest priority interrupt is serviced in step 528. After the ISR is finished, step 530 is performed to restore the original settings of the mask register as well as the general purpose registers that were used during this method are restored so as not to cause problems with other programs. Finally, the stack is cleaned up in step 532 and the method ends in step 534.

This interruption scheme eliminates the need to implement 8259 or APIC based interrupt controllers on the IOP 300. This interruption scheme also allows software running on the IOP 300 to manage the prioritization of multiple interrupt sources from the internal control registers 360. Using the NMI permits software on the IOP 300 to implement a general interrupt dispatch routine at a known location (INT2) without having to read the vector from an external agent (8259 or APIC). The NMI interrupt dispatch routine no longer has to perform EOIs to the 8259 or to the APIC interrupt controllers.

The present invention maximizes the concurrency and balance between the secondary PCI devices, the IOCPU 362, and the host operating system. The architecture of the present invention removes the bottleneck and latency from the IOP and the PCI-based accesses to the local memory by incorporating two separate dual-ported memory subsystems (burst buffers) 304 and 305. The burst buffers 304 and 305, being shared local memory for the IOP, allow the IOCPU 362 and other devices (such as an external PCI agent (not shown) or internal DMA controllers 310 and 311) simultaneously to access a common region of memory.

Recent input-output schemes, such as $I_2O$, dictate that the IOP manage the interface between the host operating system and the peripheral devices. Because peripheral devices do not share common message formats or structures, it is left to the IOP to encapsulate the variety of message formats into a common structure that the IOP can share with the host operating system. For example, in a typical $I_2O$ scenario, the secondary PCI devices will post their data/messages into the secondary burst buffer 305. The IOCPU 362 will convert these device-specific messages into an $I_2O$ compatible message. After the message has been formed, it can be forwarded to the host via a transfer by the DMA controller 311 or posted to the secondary FIFO 313 or primary FIFO 312. The output secondary FIFO 313 or primary FIFO 312 are queues which guarantee the sequential ordering of data transfers.

A special case exists when the device's message contains data which is in the proper format for immediate processing by the host. The IOCPU 362 then becomes an administrator to the secondary PCI device. If the IOCPU 362 has only to perform administrative duties and is not concerned with manipulating blocks of data, then the secondary PCI device can post its data directly to the host by traversing the PCI-to-PCI bridge 340. Immediate posting removes any buffer-copy which is incurred when the message is processed by the IOCPU 362.

The case of a host-to-device transfer is similar to the example given above. The host has the ability to communicate directly with the device or request that the IOCPU 362 manage the device. The host submits a request to the IOCPU 362 by writing to the doorbell status register 404 (shown in FIG. 3). The doorbell register 404 is compared to the doorbell mask register 402, and if the result is non-zero, the non-maskable interrupt (NMI) is asserted to the IOCPU 362.

Immediately after the NMI has been asserted, the IOCPU 362 is vectored to the level 2 of the interrupt dispatch table (for which it is hard-wired) which is where a trap routine resides (see FIG. 4). The methodology of FIG. 4 is invoked so that the doorbell mask register 402 and the doorbell status register 404 are read to determine the source of the interrupt. Once the interrupt source has been identified, the IOCPU 362 is vectored to the appropriate interrupt service routine according to the bit-settings of the doorbell status register 404. The IOCPU 362 interrupt service routine contains the necessary mechanisms to transform the host's message into device-specific commands for transfer to the I/O device in question. When the IOCPU 362 exits the service routine, the IOCPU 362 resets the bits in the doorbell status register 404 and the doorbell mask register 402.

The following example illustrates a sample message transfer from a secondary PCI device to the host. First, how device messages are placed into local memory will be discussed, then how the IOCPU 362 processes the interrupt and the message/data. Finally, the transfer of the message from the local memory to the host will be described.

There are two ways in which a device's message (or raw data) can be placed into the secondary burst buffer 305. In one method, the IOCPU 362 will provide the secondary PCI device with a list of memory blocks in which the device can place its data and messages. After the device has placed its message into the secondary burst buffer 305, the device generates an interrupt to control logic 382 which will write the message to the internal control registers 360 and ultimately to the doorbell registers 402 and 404. This message will then be handled according to the method described in FIG. 4.

In another example, the secondary PCI device generates an interrupt in order to have the IOCPU 362 set up a DMA controller 311 transfer from the device to the secondary burst buffer 305. After the DMA controller 311 has completed the transfer the message/data can be processed. The I/O device interrupt will write to the internal control registers 360 (i.e., the doorbell registers 402 and 404) that will prompt the IOCPU 362 NMI to be asserted. When the IOCPU 362 enters its NMI service routine, the doorbell status register 404 and doorbell mask registers 402 will be read to determine the source of the interrupt. If a device caused the interrupt, the IOCPU 362 must read the doorbell status register 404 in order to determine the action that must be taken. The IOCPU 362 cycles through the bits in the doorbell status register 404 to determine the appropriate ISR which access the device registers and are converted into PCI reads and writes by the software contained within the present invention. Once the IOCPU 362 has processed the message/data, the information is encapsulated into a message compatible with the input-output scheme, such as $I_2O$.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having at least one input-output platform, said input-output platform having an input-output bus, at least one input-output device, and an input-output central processing unit with a non-maskable interrupt, said computer system further having a host node having at least one central processing unit and a host operating system, said host node connected to said input-output bus of said input-output platform, said input-output platform further comprising:

a mask register, said mask register capable of receiving a message, said mask register further capable of writing a MASK signal;

a status register, said status register capable of receiving said message received by said mask register, said status register further capable of writing an INT signal; and circuitry for processing said MASK signal from said mask register and said INT signal from said status register to trigger said non-maskable interrupt of said input-output central processing unit;

wherein said non-maskable interrupt triggers an interrupt service routine that handles said message.

2. A computer system having at least one input-output platform, said input-output platform having an input-output bus, at least one input-output device, and an input-output central processing unit with a non-maskable interrupt, said computer system further having a host node having at least one host central processing unit and a host operating system, said host node connected to said input-output bus of said input-output platform, said computer system further comprising:

at least two registers, each of said registers capable of receiving input-output messages; and circuitry, said circuitry capable of processing said messages received by said registers and issuing said non-maskable interrupt to said input-output central processing unit;

wherein said non-maskable interrupt causes an interrupt dispatch routine to be called to handle said message.

3. A computer system as in claim 2, wherein said at least two registers can each contain 32 bits.

4. A computer system as in claim 2, wherein said input-output message can be issued by one of said host central processing units and by said input-output device.

5. A computer system as in claim 2, wherein said at least two registers can each contain an equal number of bits.

6. A computer system as in claim 2, wherein at least one of said at least two registers is a mask register having a series of bits and at least one of said at least two registers is a status register having a series of bits, said circuitry having:

at least two AND gates forming a first AND gate set, said first AND gate set taking as a first input a MASK signal for each said bit of said mask register and as a second input an INT signal for each said bit of said status register, said first AND gate set having an output for each of said AND gates;

an OR gate taking as its inputs said outputs of said first AND gate set, said OR gate further having an output; and a final AND gate, said final AND gate set taking as a first input said output of said OR gate and as a second input a negation of said message, said final AND gate capable of issuing said non-maskable interrupt to said input-output central processing unit.

7. A computer system as in claim 6, wherein said circuitry is capable of ignoring repeated subsequent copies of said message.

8. A computer system as in claim 6, wherein said circuitry is capable of accepting messages of higher priority.

9. A method of handling interrupt requests in a computer system having at least one input-output platform, said input-output platform having an input-output bus, at least one input-output device, and an input-output central processing unit with a non-maskable interrupt, said computer system further having a host node having at least one host central processing unit and a host operating system, said host node connected to said input-output bus of said input-output platform, said method comprising the steps of:

(a) writing an interrupt request message to a status register, said status register having a series of bits;

(b) setting said bits of said status register according to said interrupt request message;

(c) asserting said non-maskable interrupt to said input-output central processing unit;

(d) vectoring said interrupt to a trap routine;

(e) reading said doorbell register to determine a source of said interrupt request message; and (f) vectoring to an interrupt service routine based upon said settings of said bits of said status register;

wherein said interrupt request message is serviced.

10. A method as in claim 9, wherein said computer system further comprises a mask register, said mask register having a series of bits, said step (a) further comprises the step of:

(aa) writing an interrupt request to said mask register.

11. A method as in claim 10, wherein said step (b) further comprises the step of:

(ba) setting said bits of said mask register according to said interrupt request message.

12. A method as in claim 11, wherein after said step (b) but before said step (c), performing the following step:

(b1) checking said bits of said mask register and said status register to determine if said interrupt request message has a priority higher than a previously received interrupt request message.

13. A method as in claim 11 wherein after said step (e) but before said step (f), performing the following step:

(e1) reading said mask register so that a previously masked off interrupt request message is not enabled.

14. A method as in claim 9, wherein after said step (e) and before said step (f), performing the following steps:

(e2) fixing up a stack so that an IRET instruction can be used to vector to a specific interrupt service routine.

15. A method as in claim 14 further comprising the step of:

(e3) clearing a source of said interrupt request message from said status register.

16. A method as in claim 10, wherein after said step (f), performing the following steps:

(g) restoring said mask register.

17. A method as in claim 14 further comprising the step of:

(h) cleaning up said stack.

18. A computer system having at least one input-output platform, said input-output platform having an input-output bus, at least one input-output device, and an input-output central processing unit with a non-maskable interrupt, said computer system further having a host node having at least one central processing unit, system memory, and a host operating system, said host node connected to said input-output bus of said input-output platform, said host operating system comprising:

a mask register, said mask register capable of receiving a message, said mask register further capable of writing a MASK signal;

a status register, said status register capable of receiving said message received by said mask register, said status register further capable of writing an INT signal; and circuitry on said input-output platform, said circuitry capable of processing said MASK signal from said mask register and said INT signal from said status register in order to trigger said non-maskable interrupt of said input-output central processing unit;

wherein said non-maskable interrupt triggers an interrupt service routine that handles said message.

19. A computer system having at least one input-output platform, said input-output platform having an input-output bus, at least one input-output device, and an input-output central processing unit with a non-maskable interrupt, said computer system further having a host node having at least one central processing unit, system memory, and a host operating system, said host node connected to said input-output bus of said input-output platform, said host operating system comprising:

a mask register, said mask register capable of receiving a message, said mask register further capable of writing a MASK signal;

a status register, said status register capable of receiving said message received by said mask register, said status register further capable of writing an TNT signal; and a signal handler, said signal handler capable of processing said MASK signal from said mask register and said INT signal from said status register to trigger said non-maskable interrupt of said input-output central processing unit;

wherein said non-maskable interrupt triggers an interrupt service routine that handles said message.

20. A computer system having at least one input-output platform, said input-output platform having an input-output bus, at least one input-output device, and an input-output central processing unit with a non-maskable interrupt, said computer system further having a host node having at least one central processing unit and a host operating system, said host node connected to said input-output bus of said input-output platform, said input-output platform further comprising a mask register, said mask register capable of receiving a message, said mask register further capable of writing a MASK signal;

a status register, said status register capable of receiving said message received by said mask register, said status register further capable of writing an INT signal; and a signal handler on said host operating system, said signal handler capable of processing said MASK signal from said mask register and said INT signal from said status register to trigger said non-maskable interrupt of said input-output central processing unit;

wherein said non-maskable interrupt triggers an interrupt service routine that handles said message.

* * * * *